United States Patent [19]

Popp et al.

[11] 4,246,158

[45] Jan. 20, 1981

[54] FIRE RETARDANT PLASTICIZED POLYVINYL CHLORIDE COMPOSITIONS CONTAINING TRIPHOSPHATE PLASTICIZER, ALUMINUM HYDROXIDE AND ANTIMONY TRIOXIDE FILLER

[75] Inventors: Walter Popp; Johannes Sedivy, both of Burghausen, Fed. Rep. of Germany

[73] Assignee: Wacker-Chemie GmbH, Munich, Fed. Rep. of Germany

[21] Appl. No.: 33,996

[22] Filed: Apr. 27, 1979

[30] Foreign Application Priority Data

Feb. 9, 1979 [DE] Fed. Rep. of Germany ....... 2905011

[51] Int. Cl.$^3$ .............................................. C08K 5/49
[52] U.S. Cl. ............................................. 260/30.6 R
[58] Field of Search .................................. 260/30.6 R

[56] References Cited

U.S. PATENT DOCUMENTS

| | | | |
|---|---|---|---|
| 2,227,154 | 12/1940 | Russell | 260/30.6 R |
| 3,801,526 | 4/1974 | Tonning | 260/30.6 R |
| 4,098,748 | 7/1978 | Moore et al. | 260/30.6 R |
| 4,129,535 | 12/1978 | Elcik | 260/30.6 R |

*Primary Examiner*—Joseph L. Schofer
*Assistant Examiner*—Peter F. Kulkosky
*Attorney, Agent, or Firm*—Hammond & Littell, Weissenberger and Muserlian

[57] ABSTRACT

Soft or plasticized polyvinyl chloride compositions with good chemical, mechanical and electrical properties characterized by their fire-retardant and flame-resistant properties comprising polyvinyl chloride with a content of a triphosphate plasticizer, aluminum hydroxide and antimony trioxide compounds. The compositions are particularly suitable for use in electrical conductors as sheathings and/or insulation.

5 Claims, No Drawings

FIRE RETARDANT PLASTICIZED POLYVINYL CHLORIDE COMPOSITIONS CONTAINING TRIPHOSPHATE PLASTICIZER, ALUMINUM HYDROXIDE AND ANTIMONY TRIOXIDE FILLER

BACKGROUND OF THE INVENTION

Soft or plasticized polyvinyl chloride compositions are used for many purposes in industry. However, the plasticization of the PVC results in a clear deterioration of the flame resistance of the polyvinyl chloride. For this reason it has been tried repeatedly to make polyvinyl chloride compositions more fire resistant, particularly less inflammable, by either adding flame-retarding plasticizers or by the incorporation of additional flame-retarding substances (see, for example, Published German applications Nos. DOS 19 26 412, 19 31 697; and 24 59 957). Such plasticizers and additives, however, caused in the past, a deterioration of the mechanical, chemical and/or electrical properties of these plasticized polyvinyl chloride compositions, and the flame resistance was not always satisfactory.

OBJECTS OF THE INVENTION

An object of the present invention is the development of a soft or plasticized polyvinyl chloride with good chemical, mechanical and electrical properties together with good fire-retardant and flame-resistant properties.

Another object of the present invention is the production of a plasticized polyvinyl chloride composition with flame-resistant properties consisting essentially of (a) for every 100 parts by weight of a vinyl chloride polymer selected from the group consisting of polyvinyl chloride, copolymers of vinyl chloride with up to 10% of monomers copolymerizable with vinyl chloride, and mixtures thereof, (b) from 1 to 7 parts by weight of conventional stabilizers against decomposition, (c) from 20 to 100 parts by weight of a plasticizer mixture of from 50% to 100% by weight of the mixture of at least one phosphoric acid triester having the formula

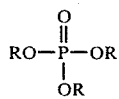

wherein R is a member selected from the group consisting of alkyl having from 2 to 10 carbon atoms, chloroalkyl having from 2 to 10 carbon atoms, phenyl, $C_{1-4}$-alkylphenyl and di-$C_{1-4}$-alkylphenyl, and from 0 to 50% by weight of the mixture of chlorinated paraffins containing from 30% to 60% chlorine content, based on the total possible chlorine substitution, (d) from 15 to 100 parts by weight of aluminum hydroxide filler, (e) from 2 to 10 parts by weight of a flameretarding substance selected from the group consisting of antimony trioxide and complexes of antimony trioxide and silica, (f) from 0 to 10 parts by weight of conventional flame inhibitors selected from the group consisting of zinc boron salts and tri-polybromoalkyl phosphates with 2 to 5 carbon atoms in the alkyl, each with 2 to 4 bromine atoms, and mixtures thereof where the total amount of flame inhibitors and retarding substances does not exceed 15 parts by weight, and (g) from 0 to 10 parts by weight of auxiliary substances selected from the group consisting of lubricants, pigments, light protecting agents, processing aids, conventional fillers and conventional plasticizers.

These and other objects of the invention will become more apparent as the description thereof proceeds.

DESCRIPTION OF THE INVENTION

The subject of the present invention are soft or plasticized polyvinyl chloride compositions containing (a) 100 parts by weight of polyvinyl chloride
(b) 1 to 7 parts by weight of stabilizer
(c) 20 to 100 parts by weight of plasticizer
(d) 15 to 100 parts by weight of filler, characterized in that they contain, as a plasticizer one or more phosphoric esters with, optionally, chlorine substituted alkyl radicals with 2 to 10 carbon atoms and/or, optionally, substituted phenyl radicals, as a filler aluminum hydroxide, and as a flame-retarding substance antimony trioxide or complex antimony compound in amounts of 2 to 10 parts by weight.

Broadly, therefore, the present invention relates to a plasticized polyvinyl chloride composition comprising (a) 100 parts by weight of polyvinyl chloride,
(b) 1 to 7 parts by weight of conventional stabilizers against decomposition,
(c) 20 to 100 parts by weight of a plasticizer phosphoric acid ester with an alcohol moiety selected from the group consisting of alkyl having 2 to 10 carbon atoms, chlorine substituted alkyl having 2 to 10 carbon atoms, phenyl and lower alkyl substituted phenyl,
(d) 15 to 100 parts by weight of aluminum hydroxide filler, and
(e) 2 to 10 parts by weight of a flame-retarding substance selected from the group consisting of antimony trioxide and complex antimony compounds.

More particularly, the invention relates to a plasticized polyvinyl chloride composition with flame-resistant properties consisting essentially of (a) for every 100 parts by weight of a vinyl chloride polymer selected from the group consisting of polyvinyl chloride, copolymers of vinyl chloride with up to 10% of monomers copolymerizable with vinyl chloride, and mixtures thereof, (b) from 1 to 7 parts by weight of conventional stabilizers against decomposition, (c) from 20 to 100 parts by weight of a plasticizer mixture of from 50% to 100% by weight of the mixture of at least one phosphoric acid triester having the formula

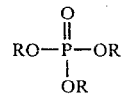

wherein R is a member selected from the group consisting of alkyl having from 2 to 10 carbon atoms, chloroalkyl having from 2 to 10 carbon atoms, phenyl, $C_{1-4}$-alkylphenyl and di-$C_{1-4}$-alkylphenyl, and from 0 to 50% by weight of the mixture of chlorinated paraffins containing from 30% to 60% chlorine content, based on the total possible chlorine substitution, (d) from 15 to 100 parts by weight of aluminum hydroxide filler, (e) from 2 to 10 parts by weight of a flame-retarding substance selected from the group consisting of antimony trioxide and complexes of antimony trioxide and silica, (f) from 0 to 10 parts by weight of conventional flame inhibitors selected from the group consisting of zinc boron salts and tri-polybromoalkyl phosphates with 2 to 5 carbon atoms in the alkyl, each with 2 to 4 bromine atoms, and mixtures thereof, where the total amount of the flame inhibitors and retarding substances does not exceed 15 parts by weight, and (g) from 0 to 10 parts by weight of auxiliary substances selected from the group consisting of lubricants, pigments, light protecting agents, processing aids, conventional fillers and conventional plasticizers.

The soft or plasticized PVC compositions according to the invention are suitable for all applications where, in addition to the known mechanical properties of plasticized PVC, non-combustibility or difficult flammability are important, such as, in construction, automotive engineering and in electrical installations. As examples of such applications are: as a material for packings and profiles, but particularly as sheathings and/or insulation of electric conductors, such as cables.

By the use of the composition according to the invention, the low flammability of hard PVC can be achieved without the expected loss of the mechanical, chemical and electrical properties (see German Patent DAS No. 23 11 550), compared to the conventionally plasticized and therefore highly inflammable PVC, which would make their use in the above-mentioned fields impossible.

The measure of the inflammability and combustibility of a material frequently used is the oxygen index according to Fenimore and Marin (LOI=low oxygen index, according to ASTM D-2863-70). The LOI indicates at which minimum volume percentage of oxygen in a nitrogen-oxygen mixture, combustion of the specimen can still be maintained.

Another important criterion for the combustion behavior is the flue gas density (according to ASTM D-2843-70). The flue gas density indicates the percentage of the extinction of a light ray through a layer of combustion gases.

A prerequisite for the admissible use of contruction materials is frequently its assignment to a certain combustion class of the German Industrial Specifications DIN 4102. In addition to class A for mineral construction materials, e.g. silicate materials, there are the classes B1 for difficultly flammable, B2 for flammable, and B3 for highly flammable construction materials.

The soft PVC compositions according to the invention far exceed the requirements for combustion class B1, that is, they extinguish within a short period of time when the initial flame is removed and their combustion gases have low temperatures; furthermore, they exceed by far the LOI-limiting value of 27 for self-extinguishing materials, and the flue gas density is likewise considerably reduced.

Hard PVC generally has an oxygen index (LOI) of about 45 to 48, but even this index can be attained by the composition according to the invention. In general, the LOI value of the compositions of the invention is not below 30.

The polyvinyl chloride employed can be any PVC which could be used heretofore for plasticized polyvinyl chloride compositions, in particular, a PVC produced by mass, emulsion, suspension or solution polymerization, particularly with K-values of 60 to 80.

The terms polyvinyl chloride and PVC are understood here also to cover a polyvinyl chloride which contains other polymerizable monomers or which can be diluted or mixed with other polymers. Such other polymers, which can be contained in polyvinyl chloride used according to the invention as starting hard PVC in amounts of up to about 10% by weight, can be homopolymers or copolymers from the same monomer(s) copolymerized with vinyl chloride, which can be polymerized with vinyl chloride in amounts of up to 10% by weight in the PVC to be plasticized. The vinyl chloride polymer preferably can be polyvinyl chloride or copolymers of vinyl chloride with up to 10% of mono-olefinically unsaturated monomers copolymerizable with vinyl chloride. Examples of such mono-olefinically-unsaturated monomers copolymerizable with vinyl chloride are: olefins, particularly alkenes having 2 to 5 carbon atoms such as ethylene; vinyl esters of saturated carboxylic acids, particularly vinyl alkanoates having 1 to 18 carbon atoms in the alkanoate, such as vinyl acetate and vinyl butyrate; vinyl halides such as vinyl bromide and vinylidene chloride; and esters of mono-olefinically unsaturated carboxylic acids, particularly alkyl alkenoates having 1 to 7 carbon atoms in the alkyl and 3 to 5 carbon atoms in the alkenoate, such as ethyl acrylate or methyl methacrylate.

The amounts of the components contained in the soft or plasticized PVC compositions according to the invention relate in each instance to 100 parts by weight of the PVC component (a).

The stabilizers employed in the soft PVC compositions according to the invention are the usual stabilizers against decomposition, particularly by heat, individually or in mixture in amounts of 1 to 7 parts by weight, preferably 2 to 6 parts by weight. Examples of such suitable heat stabilizers are: calcium, barium, zinc and cadmium compounds, particularly with higher fatty acids like stearic acid, and 2-ethylhexanoic acid, and organotin compounds, particularly dialkyltin salts of lower alkanoic acids like dibutyl tin diacetate. For use of the compositions, according to the invention for insulations and sheathings of electrical conductors, lead compounds are preferred as heat stabilizers, individually or in mixture, such as lead sulfates, e.g. di- or tribasic lead sulfates, lead phosphate, lead stearate and lead phthalate. Mixtures of lead compounds and the stearates are preferred.

Suitable plasticizers according to the invention contain one or more phosphoric acid esters, preferably tertiary phosphoric acid esters with, optionally, chlorine-substituted alkyl radicals with 2 to 10 carbon atoms and/or with, optionally, substituted phenyl radicals in amounts of 20 to 100 parts by weight, preferably 30 to 80 parts by weight. Substituted phenyl radicals are particularly alkyl substituted.

The preferred phosphoric acid esters are phosphoric acid triesters having the formula

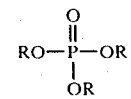

wherein R is a member selected from the group consisting of alkyl having from 2 to 10 carbon atoms, chloroalkyl having from 2 to 10 carbon atoms, phenyl, $C_{1-4}$-alkylphenyl and di-$C_{1-4}$-alkylphenyl. The following triesters can be mentioned: tricresyl phosphate, triphenyl phosphate, cresyldiphenyl phosphate, dicresylphenyl phosphate, xylenyldiphenyl phosphate, dixylenyl-phenyl phosphate, tris-(chloroethyl) phosphate, diphenyl-octyl phosphate, phenyldioctyl phosphate, and trioctyl phosphate. If the compositions of the invention contain mixtures of these plasticizers, these mixtures can consist of different, but preferably equal amounts of the individual components.

In a preferred embodiment, the amount of phosphate plasticizer is partly substituted up to 50% of the plasticizer by chlorinated paraffin with a chlorine content of 30% to 60%, preferably about 50%, related to the number of chlorine atoms in the corresponding perchlorinated paraffin. Preferably the portion of the chlorinated paraffin is 20% to 50% by weight of the total plasticizer content.

As fillers, the compositions according to the invention contain aluminum hydroxide, preferably in amounts of 50 to 90 parts by weight. Included in the term aluminum hydroxide, which preferably has particle sizes of up to 2 micrometer, is a substance which is frequently also called aluminum oxide hydrate, aluminum oxyhydrate, alumina hydrate or aluminum hydrate, and which is frequently represented by the following formula: $Al(OH)_3$ or $Al_2O_3 \cdot H_2O$. The aluminum hydroxide can contain so-called neutral, but also so-called basic or acid aluminum hydroxide, that is, it can optionally contain aluminates or aluminum salts in amounts up to about 25% by weight. Preferably, however, it is free of such compounds.

Furthermore, the soft PVC compositions according to the invention contain at least one so-called flame inhibitor or flame retarder in a total amount of 2 to 10 parts by weight, preferably 3 to 8 parts by weight. Such flame inhibitors are antimony trioxide and/or complex antimony compounds, preferably antimony trioxide silica complexes. Examples for the latter are "Oncor® 75RA" and "Oncor® 75RAZ" by National Lead Inc. New York, USA, two antimony trioxide/silica complexes.

Preferred embodiments can contain, in addition to the antimony compound(s) individually or in mixture additional flame inhibitors, like zinc borate and tri-(bromoalkyl) phosphate with $C_{2-5}$-alkyl radicals, each with 2 to 4 bromine atoms as substituents, preferably tris-(2,3-dibromopropyl) phosphate.

These flame inhibitors can be contained in amounts of 2 to 10 parts by weight, provided the total amount of all flame inhibitors, that is, of antimony compound(s), optionally, zinc borate and, optionally, trialkyl brominated phosphates, does not exceed 15 parts by weight per 100 parts by weight of the PVC component.

In addition, additional substances, as they are usually added to plasticized PVC compositions, can be added to the compositions according to the invention, in amounts of up to 2 parts by weight each, but preferably not more than a total of 10 parts by weight, for example, lubricants, pigments, light protecting agents, processing aids.

Furthermore, up to 10% by weight of the filler and/or of the plasticizer can be replaced by other conventional fillers of plasticizers without any substantial deterioration of the properties.

The soft PVC compositions according to the invention can be produced, like the presently known compositions, that is, by mixing or kneading in suitable apparatus.

The following examples are illustrative of the practice of the invention without being limitative in any respect.

EXAMPLES 1 to 5 and COMPARISON TEST

The following Table shows for various plasticized PVC compositions of the invention the composition (in parts by weight), the oxygen index (LOI value in % by vol.), the flue gas density (% extinction), the shore A hardness, the residual length after combustion (in %) and the flue gas temperature (in °C.). The last two values are determined, similar to DIN 4102, in small combustion chambers with samples of $200 \times 40 \times 4$ $mm^3$. The conditions of combustion class B1 are a residual length of the sample after selfextinction of at least 15% of the original length, and a combustion gas temperature below 200° C.

TABLE

| | Examples | | | | | Comparison Test |
|---|---|---|---|---|---|---|
| | 1 | 2 | 3 | 4 | 5 | |
| Suspension PVC, K-value 70 | 100 | 100 | 100 | 100 | 100 | 100 |
| Stabilizer compound[1] | 4 | 4 | 4 | 4 | 4 | 4 |
| Diphenyl-cresyl phosphate | 30 | 30 | 20 | 20 | 20 | — |
| Diphenyl-octyl phosphate | 30 | 30 | 20 | 20 | 20 | — |
| Aluminum hydroxide | 70 | 70 | 70 | 70 | 70 | — |
| Antimony trioxide | 7 | 3.5 | 3.5 | — | 3.5 | — |
| Oncor(R)75 RA | — | — | — | 3.5 | — | — |
| Chlorinated paraffin 50% | — | — | 20 | 20 | 20 | — |
| Zinc borate | — | 3.5 | 3.5 | 3.5 | 3.5 | — |
| Tris-(2,3-dibromopropyl) phosphate | — | — | — | — | 4.5 | — |
| Di-2-ethylhexyl phthalate | — | — | — | — | — | 60 |
| Calcium carbonate (chalk) | — | — | — | — | — | 70 |
| LOI - value (Vol. %) | 37.6 | 42.4 | 43 | 44 | 47 | 23 |
| Flue gas density (% extinction) | 99 | 93 | 87 | 86 | 85 | 100 |
| Shore - A-hardness | 87 | 87 | 88 | 87 | 87 | 85 |
| Residual length (%) | 22.7 | 27.1 | 32.4 | 29 | 34.9 | 0 |
| Flue gas temperature (°C.) | 191 | 169 | 156 | 165 | 154 | >700 |
| Combustion class | B 1 | B 1 | B 1 | B 1 | B 1 | — |

Footnote to table:
[1]The stabilizer compound is composed of 80% by weight tribasic lead sulfate and 20% by weight of a mixture of equal parts by weight of lead stearate, calcium stearate and paraffin wax.

The preceding specific embodiments are illustrative of the practice of the invention. It is to be understood, however, that other expedients known to those skilled in the art or disclosed herein, may be employed without departing from the spirit of the invention or the scope of the appended claims.

What is claimed is:

1. A plasticized polyvinyl chloride composition consisting essentially of
   (a) 100 parts by weight of polyvinyl chloride,
   (b) 1 to 7 parts by weight of conventional stabilizers against decomposition,
   (c) 30 to 80 parts by weight of a plasticizer phosphoric acid ester with an alcohol moiety selected from the group consisting of alkyl having 2 to 10 carbon atoms, chlorine substituted alkyl having 2 to 10 carbon atoms, phenyl and lower alkyl substituted phenyl,
   (d) 50 to 90 parts by weight of aluminum hydroxide filler, and (e) 2 to 10 parts by weight of a flame-retarding substance selected from the group consisting of antimony trioxide and complex antimony compounds.

2. The plasticized polyvinyl chloride composition of claim 1 wherein up to 50% by weight of said phosphate acid ester plasticizer is replaced by chlorinated paraffin with a chlorine content of 30% to 60% based on the total possible chlorine substitution.

3. The plasticized polyvinyl chloride composition of claim 1 or 2 further characterized by a content of from 2 to 10 parts by weight of zinc borate as a flame retarding substance, where the total amount of flame retarding substances in the composition does not exceed 15 parts by weight.

4. The plasticized polyvinyl chloride composition of claim 1 or 2 further characterized by a content of from 2 to 10 parts by weight of tri-brominated-alkyl phosphates, where the alkyls have 2 to 5 carbon atoms and 2 to 4 bromine substituents, as a flame retarding substance, where the total amount of flame retarding substances in the composition does not exceed 15 parts by weight.

5. A plasticized polyvinyl chloride composition with flame-resistant properties consisting essentially of
(a) for every 100 parts by weight of a vinyl chloride polymer selected from the group consisting of polyvinyl chloride, copolymers of vinyl chloride with up to 10% of monomers copolymerizable with vinyl chloride, and mixtures thereof,
(b) from 1 to 7 parts by weight of conventional stabilizers against decomposition,
(c) from 30 to 80 parts by weight of a plasticizer mixture of from 50% to 100% by weight of the mixture of at least one phosphoric acid triester having the formula

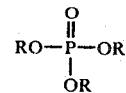

wherein R is a member selected from the group consisting of alkyl having from 2 to 10 carbon atoms, chloroalkyl having from 2 to 10 carbon atoms, phenyl, $C_{1-4}$ alkylphenyl and di-$C_{1-4}$-alkylphenyl, and from 0 to 50% by weight of the mixture of chlorinated paraffins containing from 30% to 60% chlorine content, based on the total possible chlorine substitution,
(d) from 50 to 90 parts by weight of aluminum hydroxide filler,
(e) from 2 to 10 parts by weight of a flame-retarding substance selected from the group consisting of antimony trioxide and complexes of antimony trioxide and silica,
(f) from 0 to 10 parts by weight of conventional flame inhibitors selected from the group consisting of zinc boron salts and tri-polybromoalkyl phosphates with 2 to 5 carbon atoms in the alkyl, each with 2 to 4 bromine atoms, and mixtures thereof, where the total amount of flame inhibitors in (e) and (f) does not exceed 15 parts by weight, and
(g) from 0 to 10 parts by weight of auxiliary substances selected from the group consisting of lubricants, pigments, light protecting agents, processing aids, conventional fillers and conventional plasticizers.

* * * * *